United States Patent Office 3,825,599
Patented July 23, 1974

3,825,599
PERFLUOROMETHYLPROPIONYLKETENE
David C. England, Wilmington, Del., assignor to E. I. du Pont de Nemours and Company, Wilmington, Del.
No Drawing. Filed June 28, 1972, Ser. No. 267,126
Int. Cl. C07c 49/22
U.S. Cl. 260—585.5      4 Claims

ABSTRACT OF THE DISCLOSURE 2-(Trifluoromethyl)perfluoropentene-2 reacts with an alkali metal lower alkoxide to give cis- and trans-alkyl-2-(trifluoromethyl)-1,1,4,4,5,5,5 - heptafluoro-3-alkoxypent-2-enyl ether which is then reacted with sulfur trioxide to give perfluoromethyl propionylketene. On contacting perfluoromethylpropionylketene with an alkali metal fluoride in a polar solvent between room temperature and 150° C., three products are obtained, the proportions varying with the conditions. With a catalytic amount of alkali metal fluoride or silver oxide the product is mainly a dimer below 60° C. Above 60° C. a pyranopyran-2,5-dione is formed. If an equi-molar amount of alkali metal fluoride is employed the product is a metal derivative of pyran-4-one.

Perfluoromethylpropionylketene and the above derivatives are all useful as waterproofing agents for textiles and paper.

Also disclosed is a method of separating perfluoromethylpropionylketene from by-product alkyl sulfonates by contacting the mixed vapors with an alkali metal fluoride at 250° C. to 700° C.

FIELD OF THE INVENTION

This invention is concerned with a new acylketene and its derivatives, which are useful waterproofing agents, to intermediates for making the same and to the isolation of the acylketene.

BACKGROUND OF THE INVENTION

In the past acylketene structures have been erroneously proposed for certain aldoketene dimers. For example, in U.S. 2,369,919 (1945) the structure $$RCH_2COC(R)=C=O$$

was proposed for ketene dimers prepared by dehydrohalogenation of selected acid halides. Later these compounds were conclusively shown to have cyclic β-lactone structures by D. W. Moore, J. Chem. Phys. 34, 1470 (1961). The closest known related compounds are the acylketene acetals shown by R. Scarpati et al., Tetrahedron 20, 2735–44 (1964) and R. Pappo, U.S. 3,080,360 (1963).

SUMMARY OF THE INVENTION

The present invention is directed to the compound perfluoromethylpropionylketene having the formula:

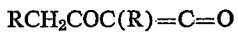

to a dimer of the same having the formula:

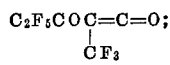

to derivatives of perfluoromethylpropionylketene having the formulas:

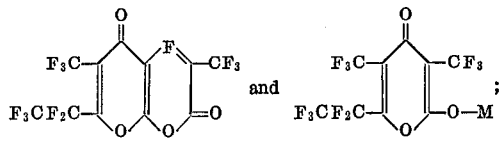

wherein M is an alkali metal, to a method of making the dimer and derivatives by reaction of perfluoromethylpropionylketene in solution with an alkali metal fluoride or AgO; to a method making perfluoromethylpropionylketene by contacting an alkyl 2-(trifluoromethyl) - 1,1,4,4,5,5,5 - heptafluoro - 3 - alkoxypent-2-enyl ether with sulfur trioxide at a temperature in the range between 0 to 100° C., preferably 20 to 40° C.; and to a method of separating perfluoromethylpropionylketene from alkyl fluorosulfates by contacting a mixture of the vapors of these compounds with an alkali metal fluoride at a temperature in the range of 250 to 700 ° C.

DETAILED DESCRIPTION OF THE INVENTION

The present invention is concerned with the discovery of:

(a) perfluoromethylpropionylketene [also named perfluoro(2-methyl - 1 - pentene - 1,3 - dione) or 4,4,5,5,5-pentafluoro - 2 - (trifluoromethyl) - 1 - pentene-1,3-dione], (b) a process for its preparation by the reaction of 2-(trifluoromethyl)perfluoropentene-2 with an alkali metal lower alkoxide followed by treating the intermediate isomeric unsaturated ethers with $SO_3$, (c) a dimer formed from two moles of perfluoromethylpropionylketene in a polar solvent in the presence of a catalytic amount of an alkali metal fluoride or AgO at about room temperature, to about 60° C., (d) a pyranopyran - 2,5 - dione formed by reaction of the dimer with perfluoromethylpropionylketene in a polar solvent with a catalytic amount of an alkali metal fluoride or AgO at about 60° C. to 150° C., and (e) a metal derivative of a pyran-4-one formed by reaction of perfluoromethylpropionylketene in a polar solvent with about an equimolar amount of an alkali metal fluoride at a temperature between about room temperature and 150° C. This sequence may be illustrated as follows:

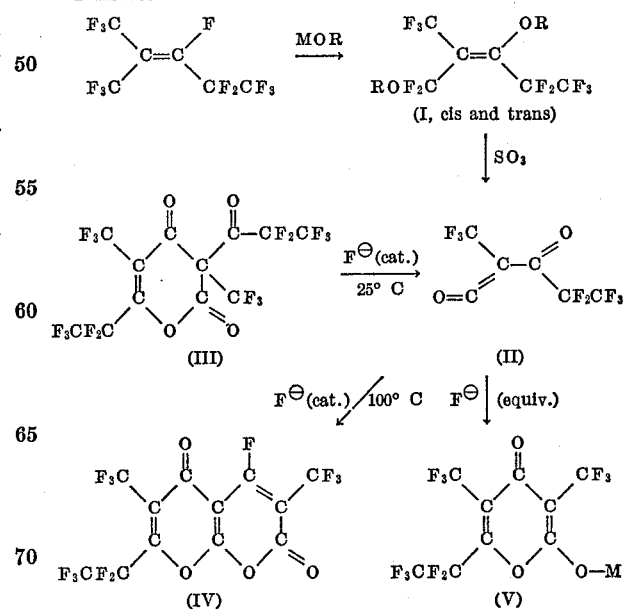

in which M is an alkali metal such as Li, Na, K or Cs, R is a saturated lower alkyl group (1 to 6 carbons).

The reaction of 2-(trifluoromethyl)perfluoropentene-2 with an alkali metal alkoxide may be carried out neat. However, the reaction is more readily controlled when it is carried out in solution in a lower alkyl alcohol, preferably one in which the alkyl group is the same as that in the alkali metal alkoxide (ROH). The molar ratio in which the alkali metal alkoxide and the 2-(trifluoromethyl)-perfluoropentene-2 may be brought together to carry out this reaction may be varied widely, i.e., from 1:2 to 10:1, respectively, a molar ratio of about 2:1 being preferred.

This reaction may be carried out at temperatures in the range from —60 to 40° C., with temperatures in the range from —20 to 0° C. being preferred. Pressure is not a critical variable in this process and pressures above and below atmospheric pressure may be used, atmospheric pressure being preferred for convenience.

The product of the above reaction is a mixture of the cis and trans isomers of the corresponding alkyl 2-(trifluoromethyl) - 1,1,4,4,5,5,5 - heptafluoro-3-alkoxypent-2-enyl ether (formula I) in which the alkyl groups are those from the alkali metal alkoxide. In the second step of the preparation, these isomers are useful either in the form of a crude mixture or in isolated form for preparing perfluoromethylpropionylketene.

In the reaction of the ether or ethers prepared as shown above with sulfur trioxide, the molar ratio in which sulfur trioxide and fluoro ether may be brought together may be varied widely, i.e., from 1:2 to 10:1, respectively, a molar ratio of about 2:1 being preferred for highest yields.

The reaction with sulfur trioxide may be carried out over a wide range of temperatures, particularly from 0 to 100° C., and preferably in the range from 20–40° C. Since the reaction of the fluoroethers above with sulfuric acid gives a different product, highest yields of the ketene are obtained by carrying out the reaction with sulfur trioxide under conditions as nearly anhydrous as is practical.

Pressure is not a critical factor in the reaction with sulfur trioxide. Pressures above and below atmospheric pressure may be used, and atmospheric pressure is preferred for convenience.

Perfluoromethylpropionylketene may be separated and recovered from the reaction mixture by known means such as fractional distillation, chromatography, and the like.

The economical separation of perfluoromethylpropionylketene from by-product alkyl fluorosulfate produced in the reaction with sulfur trioxide is complicated by the fact that normal distillation yields an azeotropic mixture of the two. There has now been discovered a process for separating an alkyl fluorosulfate from perfluoromethylpropionylketne by contacting a vapor phase mixture of the two at elevated temperature (250–700° C.) with solid alkali metal fluoride, e.g., by passing the vapors through a particulate bed of solid sodium fluoride. Under these conditions the perfluoromethylpropionylketene passes through unchanged and the alkyl fluorosulfate ($ROSO_2F$) is converted to solid sodium fluorosulfate ($NaOSO_2F$) and the corresponding alkyl fluoride (RF). The alkyl fluoride is easily and completely separated from the ketene by distillation. This process is also useful for separating an alkyl fluorosulfate from its mixtures with organic compounds other than ketenes.

Perfluoromethylpropionylketene is a stable liquid which may be stored in a closed container for long periods at ambient conditions without change. When dissolved at room temperature in a polar solvent containing a catalytic amount of AgO or of fluoride ion, as in a solution of a metal fluoride, the ketene is exothermically converted primarily to its dimer (formula III), the δ-lactone of perfluoro(5 - hydroxy-2,4-dimethyl-3-oxo-2-propionyl-4-heptenoic acid) which may also be named 6-(pentafluoroethyl)-3-(pentafluoropropionyl)-3,5-bis(trifluoromethyl)-3,5 - bis(trifluoromethyl)-2H-pyran-2,4-(3H)-dione. This is a low melting solid which is stable to storage at ambient conditions.

When a solution of perfluoromethylpropionylketene in a polar solvent containing a catalytic amount of dissolved AgO or fluoride ion is heated at about 100° C., the dimer III, first formed, reacts with a further molecule of perfluoromethylpropionylketene with loss of a molecule of perfluoropropionyl fluoride to yield as a primary product the bicyclic compound IV which is 4-fluoro-7-(pentafluoroethyl) - 3,6-bis(trifluoromethyl)-2H,5H-pyrano[2,3-b] pyran-2,5-dione, a high melting, crystalline solid which is stable to storage at ambient conditions for extended periods.

When perfluoromethylpropionylketene is treated with an approximately equimolar amount of a dissolved metal fluoride in a polar solvent at about room temperature, the primary product is a compound of formula V which is the corresponding metal salt of 2 - hydroxy-6-(pentafluoroethyl)-3,5-bis(trifluoromethyl)-4H-pyran-one, which may also be named the corresponding 4 - oxo-6-(pentafluoroethyl)-3,5-bis(trifluoromethyl)-4H-pyran-2-yl metal oxide. Compounds of formula V are high melting solids which are stable to storage at ambient conditions.

Polar solvents suitable for carrying out the reactions of perfluoromethylpropionylketene shown above are illustrated by acetonitrile, 1,2-dimethoxyethane (glyme), 1,5-dimethoxy-3-oxapentane (diglyme), 1,11-dimethoxy-3,6,9-trioxaundecane (tetraglyme), nitromethane and similar organic solvents.

The reactions of perfluoromethylpropionylketene in solution in a polar solvent and in the presence of catalytic amounts (less than 0.1 mol per mol of ketene) of a soluble metal fluoride may be carried out over a wide range of temperatures, e.g., from 0° to 150° C. and above. Under all these conditions measureable amounts of compounds of formulas III and IV and only trace amounts of compounds of formula V are formed. At temperatures below about 60° C. the primary product is usually the compound of formula III. At temperatures above about 60° C. the primary product is usually the compound of formula IV.

When the concentration of soluble metal fluoride in the reaction above is greater than 0.1 mol per mol of ketene, and particularly when equimolar or greater quantities are used, the primary product is a metal salt of formula V over the entire operable range of temperatures. Trace amounts of compounds of formulas III and IV are also formed.

Perfluoromethylpropionylketene, its unsaturated ether precursors of formula I, its dimer of formula III, its bicyclic derivative of formula IV and the metal salts of formula V are all useful as waterproofing agents for such materials as textiles and paper as illustrated below.

SPECIFIC EMBODIMENTS OF THE INVENTION

In the examples which follow, parts are by weight unless otherwise indicated.

Chemical shifts for PMR (proton magnetic resonance) are given in p.p.m. (parts per million) from tetramethylsilane. Chemical shifts from FMR (fluorine magnetic resonance) are given in p.p.m. from fluorotrichloromethane.

EXAMPLE 1

Methyl 2-(trifluoromethyl)-1,1,4,4,5,5,5-heptafluoro-3-methoxypent-2-enyl ether, cis- and trans-isomers A. A solution of 75 g. of 2-(trifluoromethyl)perfluoropentene-2 (a dimer of perfluoropropene—see W. Brunskill et al., Chemical Communications, 1444 (1970)) in 50 ml. of methanol was stirred with cooling at 0° C. to —10° C. while adding dropwise a solution of 30 g. of sodium methoxide in 100 ml. of methanol. When addition was complete, the mixture was allowed to come to room temperature and poured into 1 liter of ice-cold 10% hydrochloric acid. The heavy layer was washed with water and dried over magnesium sulfate. This crude product could be used directly in the next step or purified by distillation. It boiled mostly at 88–100° C./132 mm. (54 g., 67%) and was largely a mixture of the two cis- and trans-isomers, A and B.

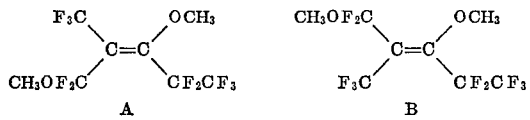

The above isomers were separated by preparatory gas chromatography using a column packed with calcined diatomite which had been crushed and screened and coated with 20% by weight of a 1:1 mixture of methyl silicone and trifluoropropyl silicone. The structures were assigned on the basis of fluorine magnetic resonance coupling constants.

For A—IR: 5.97μ (C=C), PMR: 3.66 p.p.m. (singlet, 3H), 3.30 p.p.m. (singlet, 3H). FMR: −61.1 p.p.m. (triplet, J=12.0 Hz., 3F), −68.4 p.p.m. (multiplet, 2F), −82.6 p.p.m. (triplet, J=4.4 Hz., 3F), −114.0 p.p.m. (triplet, J=20.4 Hz., 2F). $n_D^{25}$=1.3230.

Analysis.—Calcd. for $C_8H_6F_{10}O_2$: C, 29.65; H, 1.86; F, 58.64. Found: C, 29.97; H, 1.96; F, 58.49.

For B—IR: 5.94μ (C=C). PMR: 3.70 p.p.m. (singlet, 3H), 3.35 p.p.m. (singlet, 3H). FMR: −57.4 p.p.m. (multiplet, 3F), −71.7 p.p.m. (quartet, J=11.0 Hz., 2F), −82.9 p.p.m. (quartet, J=3.7 Hz., 3F), −115.1 p.p.m. (quartet, J=21.0 Hz., 2F). $n_D^{25}$=1.3301.

Analysis.—Calcd. for $C_8H_6F_{10}O_2$: C, 29.65; H, 1.86; F, 58.64. Found: C, 29.65; H, 2.01; F, 58.47.

B. Perfluoromethylpropionylketene: Additional crude product as shown in Example 1 was prepared by repeating the procedure of that example on a larger scale, e.g., starting with 630 g. of 2-(trifluoromethyl)perfluoropentene-2. The crude product, weighing 660 g., was added dropwise to 200 ml. of sulfur trioxide with stirring and cooling to keep at 30–40° C. When addition was complete, the mixture was distilled to give 410 g. of product, b.p. 80–86° C. By gas chromatographic analysis this material was shown to contain 76% perfluoromethylpropionylketene (58% overall yield from 2-(trifluoromethyl) perfluoropentene-2)) and 20% methyl fluorosulfate. Pure perfluoromethylpropionylketene was isolated by preparative gas chromatography of the product above using a column of the type shown in Example 1 and analyzed as follows:

IR: 4.60μ (C=C=O), 5.82μ (C=O). FMR: −57.8 p.p.m. (singlet, 3F), −84.7 p.p.m. (triplet, J=1.1 Hz., 3F), −122.6 p.p.m. (quartet, J=1.1 Hz., 2F). $n_D^{25}$=1.3248.

Analysis.—Calcd. for $C_6F_8O_2$: C, 28.15; F, 59.37. Found: C, 27.98; F, 59.18.

EXAMPLE 2

A. Crude product was prepared by repeating the procedure of Example 1B. Fractional distillation of this crude product gave an azeotrope containing about 85% of perfluoromethylpropionylketene and 15% of methyl fluorosulfate. A 37.9-g. sample of this azeotrope was passed as vapor at 1.6 mm. pressure over 50 g. of sodium fluoride pellets packed in a platinum tube (¾" x 16") heated to 445° C. Product collected in a liquid nitrogen-cooled trap weighed 33 g. and contained a trace of methyl fluorosulfate when analyzed by gas chromatography. After another pass through the tube, there was obtained 29 g. (90%) of perfluoromethylpropionylketene containing methyl fluoride but no methyl fluorosulfate, as shown by gas chromatographic analysis. The methyl fluoride (b.p. −78.6° C.) was easily removed from the perfluoromethylpropionylketene by distillation. Other samples of the azeotrope passed over sodium fluoride as above at 500° C. to 600° C. gave perfluoromethylpropionylketene free of methyl fluorosulfate in a single pass.

B. Pure methyl fluorosulfate (25 g.) was passed over 50 ml. of sodium fluoride pellets in the manner described in Example 2A at 550° C./1.2 minutes. Material which collected in a liquid nitrogen trap (9 g., 100%) was shown to be methyl fluoride by infrared analysis (comparison with a known sample).

EXAMPLE 3

Perfluoromethylpropionylketene dimer

Cesium fluoride (1 g.) was vacuum-dried in a Carius tube while heating with hot air (ca. 100° C.). After cooling the evacuated tube, 5 ml. of tetraethylene glycol dimethyl ether (tetraglyme) was injected by a hypodermic needle through a rubber connector. The tube was then cooled in liquid nitrogen and 75 g. of perfluoromethylpropionylketene (containing about 15% of methyl fluorosulfate) added, also by hypodermic needle. After sealing under vacuum, the tube was warmed to room temperature. An exothermic reaction occurred as the cesium fluoride slowly dissolved and a flocculant white precipitate formed (a by-product from the methyl fluorosulfate). After shaking overnight, the tube was cooled, opened and the contents distilled to give 51 g. of starting material and 21 g. of dimer boiling mostly at 65° C./0.2 mm., which solidified. After two recrystallizations from chloroform, there was obtained 13.8 g. of dimer, the δ-lactone of perfluoro-5-hydroxy-2,4-dimethyl-3-oxo-2-propionyl - 4 - heptenoic acid, melting at 40–43° C. and showing the following analyses:

IR: 5.58μ (5.49 sh), 6.02μ. FMR: −57.9 p.p.m. (triplet, J=22.8 Hz. to quartets, J=3.5 Hz., 3F), −112.3 p.p.m. (quartet, J=22.8 Hz., 2F), −82.4 p.p.m. (quartet, J=3.5 Hz., 3F), −60.2 p.p.m. (singlet, 3F), −123.7 p.p.m. (quartet, J=1.5 Hz., 2F), −84.6 p.p.m. (triplet, J=1.5 Hz., 3F).

Analysis.—Calcd. for $C_{12}F_{16}O_4$: C, 28.15 F, 59.37. Found: C, 28.46; F, 55.19.

EXAMPLE 4

A mixture of 0.5 g. of silver oxide, 5 ml. of diglyme and 15 ml. (25 g.) of perfluoromethylpropionylketene was sealed in a Carius tube cooled in liquid nitrogen. When warmed to room temperature, the silver oxide dissolved, giving a green-brown solution. After standing for 90 hours at room temperature, the tube was opened and the contents distilled. After removal of low boiling material, there was recovered 12.1 g. of the dimer of formula III and 1.5 g. of a crystalline residue. The residue was recrystallized from nitromethane and identified as the bicyclic compound of formula IV, m.p. 210° C.

EXAMPLE 5

The procedure of Example 4 was repeated with the exceptions that only 0.1 g. of silver oxide was used and the standing at room temperature was continued for only about 17 hours. There was recovered 1.2 g. of the dimer of formula III.

EXAMPLE 6

4-fluoro-7-(pentafluoroethyl)-3,6-bis(trifluoromethyl)-2H, 5H-pyrano[2,3-b]pyran-2,5-dione The procedure of Example 5 was repeated with the exception that instead of keeping the tube and contents at room temperature for about 17 hours, it was heated at about 100° C. for that period. Distillation yielded 7 g. of low boiling material and 7 g. of crystalline residue. The crystalline material was washed with ether and recrystallized three times from toluene to obtain 4.2 g. of purified compound of formula IV, 4-fluoro-7-(pentafluoroethyl)-3,6-bis-(trifluoromethyl) - 2H,5H - pyrano[2,3-b] pyran-2,5-dione, m.p. 210–211° C. An additional 2.3 g. of the product was recovered by evaporation of the filtrates from the recrystallizations.

EXAMPLE 7

A mixture of 0.1 g. of silver oxide, 2 ml. of diglyme and 5 g. of the dimer of formula III was sealed in a Carius tube cooled in liquid nitrogen. The silver oxide dissolved on warming. The tube was heated at about 100° C. After 30 minutes at this temperature, the contents of the tube became crystalline. After a total of about 17 hours of heating, the tube was opened. Distillation yielded 2 g. of perfluoropropionyl fluoride (characterized by infrared analysis) and 1.85 g. of a crystalline residue. Recrystallization of the residue from toluene yielded 1.2 g. of the compound of formula IV.

EXAMPLE 8

A mixture of 0.5 g. of silver oxide, 1 ml. of tetraglyme and 50 g. of perfluoromethylpropionylketene was sealed in a Carius tube at liquid nitrogen temperature. The tube and contents were then heated about 18 hours at about 100° C., after which the tube was opened. Distillation of the contents yielded 15 g. of perfluoropropionyl fluoride, b.p. −28° C. (identified by its infrared spectrum), 3.1 g. of crude dimer of formula III and a crystalline residue which weighed 13.2 g. after ether washing. The crystals were recrystallized from toluene to yield 10.1 g. of the compound of formula IV, 4-fluoro-7-(pentafluoroethyl)-3,6-bis(trifluoromethyl)-2H,5H - pyrano[2,3-b]pyran - 2,5-dione. FMR (20% in acetone $d_6$) −57.3 p.p.m. (triplet, J=22.5 Hz., to quartet, J=3.7 Hz., 3F); −61.6 p.p.m. (doublet, J=26.5 Hz., 3F); −82.4 p.p.m. (multiplet, 3F); −88.6 p.p.m. (quartet, J=26.5 Hz., 1F); −112.6 p.p.m. (quartet, J=22.5 Hz., to multiplet, 2F).

*Analysis.*—Calcd. for $C_{12}F_{12}O_4$: C, 33.06; F, 52.29; Mol. Wt. 435.9604. Found: C, 33.48, 33.25; F, 52.56, 52.75; Mol. Wt. 435.9635.

EXAMPLE 9

A mixture of 0.5 g. of cesium fluoride, 5 ml. of diglyme and 15 ml. (25.6 g.) of perfluoromethylpropionylketene was sealed in a Carius tube at liquid nitrogen temperature. On warming to room temperature, the cesium fluoride dissolved. The tube and contents were held at room temperature for 48 hours. The tube was opened and low boiling material removed to yield 14 g. of crystalline solid. This solid was recrystallized from nitromethane and toluene to yield a crystalline solid melting at 208–210° C. and identified as the compound of formula IV by infrared spectrum.

EXAMPLE 10

Cesium salt of 2-hydroxy-6-(pentafluoroethyl)-3,5-bis(trifluoromethyl)-4H-pyran-4-one A mixture of 3 g. of cesium fluoride, 5 ml. of diglyme and 15 ml. (25.6 g.) of perfluoromethylpropionylketene was sealed in a Carius tube at liquid nitrogen temperature. On thawing, the cesium fluoride dissolved and an exothermic reaction occurred, evidenced by gassing. The liquid in the tube then became viscous and later set to a solid mass. It was held at room temperature for 48 hours. The tube was opened and 9 g. of perfluoropropionyl fluoride was recovered by distillation, leaving a solid residue. This residue was washed with ether to yield 7.8 g. of crystals which were recrystallized from nitromethane to yield the cesium salt of 2-hydroxy-6-(pentafluoroethyl)-3,5-bis(trifluoromethyl)-4H-pyran-4-one, m.p. 235° C. (dec.). FMR (20% in acetone $d_6$): −55.4 p.p.m. (singlet, 3F); −57.0 p.p.m. (triplet, J=22.0 Hz. to quartet, J=3.15 Hz., 3F); −81.1 p.p.m. (multiplet, 3F); −111.4 p.p.m. (quartet, J=22.0 Hz., 2F).

*Analysis.*—Calcd. for $C_9F_{11}O_3Cs$: C, 21.70; F, 41.97. Found: C, 21.99, 21.92; F, 38.29, 38.19.

EXAMPLE 11

The procedure of Example 10 was repeated with the exceptions that nitromethane was used in place of diglyme and the time at room temperature was about 18 hours. There was obtained 6.8 g. of the same cesium salt of formula V.

EXAMPLE 12

A mixture of 3 g. of potassium fluoride, 5 ml. of diglyme and 15 ml. (25.6 g.) of perfluoromethylpropionylketene was sealed in a Carius tube at liquid nitrogen temperature. On warming to room temperature, the potassium fluoride dissolved with gas evolution. After about 18 hours at room temperature, the contents of the tube had solidified. The tube was opened and 9 g. of perfluoropropionyl fluoride was removed by distillation, leaving a crystalline product weighing 6.8 g. after washing with ether. A 1.8-g. sample of this product was recrystallized from nitromethane to yield 0.7 g. of purified potassium salt of 2-hydroxy - 6 - (pentafluoroethyl) - 3,5-bis(trifluoromethyl) - 4H - pyran - 4 - one melting at 250–252° C. (dec.). FMR (20% in acetone $d_6$) −57.4 p.p.m. (singlet, 3F); −58.6 p.p.m. (triplet, J=22.0 Hz. to quartet, J=3.15 Hz., 3F); −82.6 p.p.m. (multiplet, 3F); −112.8 p.p.m. (quartet, J=22.0 Hz., 2F).

*Analysis.*—Calcd. for $C_9F_{11}O_3K$: C, 26.75; F, 51.8. Found: C, 26.84, 26.94; F, 49.71, 49.68.

EXAMPLE 13

The procedure of Example 12 was repeated with the exceptions that only 1.0 g. of potassium fluoride was used and acetonitrile was used in place of diglyme. There was obtained 4.0 g. of the same potassium salt of formula V, m.p. 250–252° C.

EXAMPLE 14

Perfluoromethylpropionylketene and its derivatives as waterproofing agents for cotton and paper

*Part A:* Pieces of cotton cloth and paper were heated in a vacuum jar (ca. 500 ml. capacity) in a steam bath for 1 hour and samples of each removed as controls. Other samples were treated with perfluoromethylpropionylketene and its dimer as follows:

In one experiment 0.2 ml. of liquid perfluoromethylpropionylketene was introduced into the heated jar by means of a hypodermic needle through a rubber tubing connector. The liquid vaporized and after standing 7 hours the jar was reevacuated to remove excess ketene vapors before opening and testing.

In another experiment samples of cotton cloth and paper were impregnated with a dilute (5%) solution of the ketene dimer of Example 5 in ether. They were then heated in a steam bath under vacuum for 2 hours before testing.

Testing was as follows: Water droplets were placed on all treated and control samples. Water was rapidly absorbed by the controls but stood as beads without absorption until evaporated on all samples treated as above with either perfluoromethylpropionylketene or its dimer.

*Part B:* Samples of the pyranopyran - 2,5 - dione of Example 8 and the potassium salt of the pyran - 4 - one of Example 12 weighing 0.5 g. each were dissolved in separate 5-ml. portions of acetone in separate beakers. A third beaker contained only 5 ml. of acetone. A disc of white laboratory filter paper 4 cm. in diameter was placed in the liquid in each beaker. The beakers were then heated on a steam bath until all the acetone had evaporated. The papers were tested for water repellancy by dropping water on them at an angle. The treated samples both repelled the water drops whereas the control paper treated with acetone only absorbed the water drops on contact.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

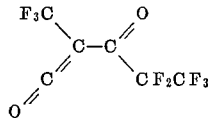

2. Method of making the compound of claim 1 which comprises contacting with sulfur trioxide under anhydrous conditions a compound having the formula

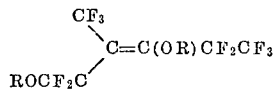

at a temperature in the range between 0 and 100° C., wherein R is a lower alkyl group.

3. Method of claim 2 wherein the temperature is in the range of 20° to 40° C.

4. A method of separating perfluoromethylpropionylketene from lower alkyl fluorosulfate which comprises contacting a mixture of the vapors of said perfluoromethylpropionylketene and said lower alkyl fluorosulfate with an alkali metal fluoride at a temperature in the range between 250° C. and 700° C. whereby the lower alkyl fluorosulfate is converted to lower alkyl fluoride, recovering a mixture of perfluoromethylpropionylketene and lower alkyl fluoride and thereafter separating the perfluoromethylpropionylketene from lower alkyl fluoride by distillation.

References Cited
UNITED STATES PATENTS

| | | | |
|---|---|---|---|
| 3,517,065 | 6/1970 | Fielding | 260—585.5 |
| 2,281,589 | 5/1942 | Mitchell | 260—585.5 X |
| 3,423,465 | 1/1969 | Andreades et al. | 260—585.5 |
| 2,323,938 | 7/1943 | Sauer | 260—585.5 X |

JOSEPH E. EVANS, Primary Examiner

N. MORGENSTERN, Assistant Examiner

U.S. Cl. X.R.

161—404; 162—158; 260—343.5, 345.9, 615 BF, 544 F, 653; 423—467; 252—8.6, 8.9

PO-1050
(5/69)

UNITED STATES PATENT OFFICE
CERTIFICATE OF CORRECTION

Patent No. 3,825,599  Dated July 23, 1974

Inventor(s) David C. England

It is certified that error appears in the above-identified patent and that said Letters Patent are hereby corrected as shown below:

| | |
|---|---|
| Column 1, line 15 | Close space in "perfluoromethylpropionylketene" |
| Column 2, line 59 | Reverse direction of arrow |
| Column 4, line 2 | Delete "3,5-bis(trifluoromethyl)-" |
| Column 5, line 15 | Correct spelling of "chromatography" |
| Column 7, line 41 | Correct spelling of "fluoride" |
| Column 9, line 16 | Change "$ROCF_2C-$" to "$ROF_2C-$"* |

Signed and sealed this 6th day of May 1975.

(SEAL)
Attest:

RUTH C. MASON
Attesting Officer

C. MARSHALL DANN
Commissioner of Patents
and Trademarks